(12) United States Patent
Sarangapurkar et al.

(10) Patent No.: US 11,620,356 B2
(45) Date of Patent: Apr. 4, 2023

(54) METHODS AND APPARATUS FOR PROVIDING DIGITAL ITEM ADVERTISEMENTS

(71) Applicant: Walmart Apollo, LLC, Bentonville, AR (US)

(72) Inventors: Raghavendra Sarangapurkar, Fremont, CA (US); Tessa Marie Ruddy, Menlo Park, CA (US); Michael Jayson C. De Leon, Dublin, CA (US); Bo Sun, Fremont, CA (US); Clayton Yetwah Chan, San Francisco, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/994,175

(22) Filed: Aug. 14, 2020

(65) Prior Publication Data
US 2022/0050881 A1 Feb. 17, 2022

(51) Int. Cl.
*G06F 16/958* (2019.01)
*G06Q 30/0241* (2023.01)
*G06F 16/28* (2019.01)
*G06F 40/106* (2020.01)
*G06F 3/0484* (2022.01)
*G06F 40/143* (2020.01)
(Continued)

(52) U.S. Cl.
CPC .......... *G06F 16/958* (2019.01); *G06F 3/0484* (2013.01); *G06F 16/287* (2019.01);
(Continued)

(58) Field of Classification Search
CPC ...... G06F 16/958; G06F 40/143; G06F 40/14; G06F 16/287; G06F 40/106;
(Continued)

(56) References Cited

U.S. PATENT DOCUMENTS

| 5,809,481 A | 9/1998 | Baron et al. |
| 7,013,290 B2 | 3/2006 | Ananian |

(Continued)

OTHER PUBLICATIONS

"Retail Auto-Guidance", https://auto-guidance.com/retail/, pp. 1-11.

*Primary Examiner* — Keith D Bloomquist
(74) *Attorney, Agent, or Firm* — Morgan, Lewis & Bockius LLP; Manita Rawat

(57) ABSTRACT

This application relates to apparatus and methods for automatically determining and providing item advertisements, such as for display on a website. In some examples, a computing device obtains a prioritized list of item advertisements for each of a plurality of item categories. The computing device also obtains an item category for each of a plurality of positions of a display interface. Each item category may correspond to one or more of the plurality of item categories. Further, the computing device determines, for each position of the plurality of positions of the display interface, an item advertisement based on the item category for the position and the prioritized list of item advertisements. The computing device generates display interface position data identifying the item advertisement determined for each position of the plurality of positions of the display interface. The computing device transmits the display interface position data to a web server.

21 Claims, 8 Drawing Sheets

(51) Int. Cl.
*G06F 40/14* (2020.01)
*G06Q 30/0251* (2023.01)

(52) U.S. Cl.
CPC .......... *G06F 40/106* (2020.01); *G06F 40/14* (2020.01); *G06F 40/143* (2020.01); *G06Q 30/0277* (2013.01); *G06Q 30/0252* (2013.01); *G06Q 30/0269* (2013.01)

(58) Field of Classification Search
CPC ............. G06F 3/0484; G06Q 30/0277; G06Q 30/0269; G06Q 30/0252; G06Q 10/087
See application file for complete search history.

(56) References Cited

U.S. PATENT DOCUMENTS

| | | | |
|---|---|---|---|
| 10,515,389 B1* | 12/2019 | Burdick | G06Q 30/0263 |
| 2004/0254860 A1 | 12/2004 | Wagner et al. | |
| 2005/0028188 A1* | 2/2005 | Latona | G06Q 30/0242 |
| | | | 725/23 |
| 2007/0150353 A1* | 6/2007 | Krassner | G06Q 30/00 |
| | | | 705/14.64 |
| 2008/0243756 A1* | 10/2008 | Moon | G06Q 30/0272 |
| 2008/0313030 A1* | 12/2008 | Makeev | G06Q 30/0275 |
| | | | 705/14.71 |
| 2009/0217316 A1* | 8/2009 | Gupta | H04L 65/607 |
| | | | 725/32 |
| 2010/0299224 A1 | 11/2010 | Borom et al. | |
| 2013/0006761 A1* | 1/2013 | Warren | G06Q 30/02 |
| | | | 705/14.49 |
| 2014/0207742 A1* | 7/2014 | Chen | G06F 16/958 |
| | | | 707/691 |

* cited by examiner

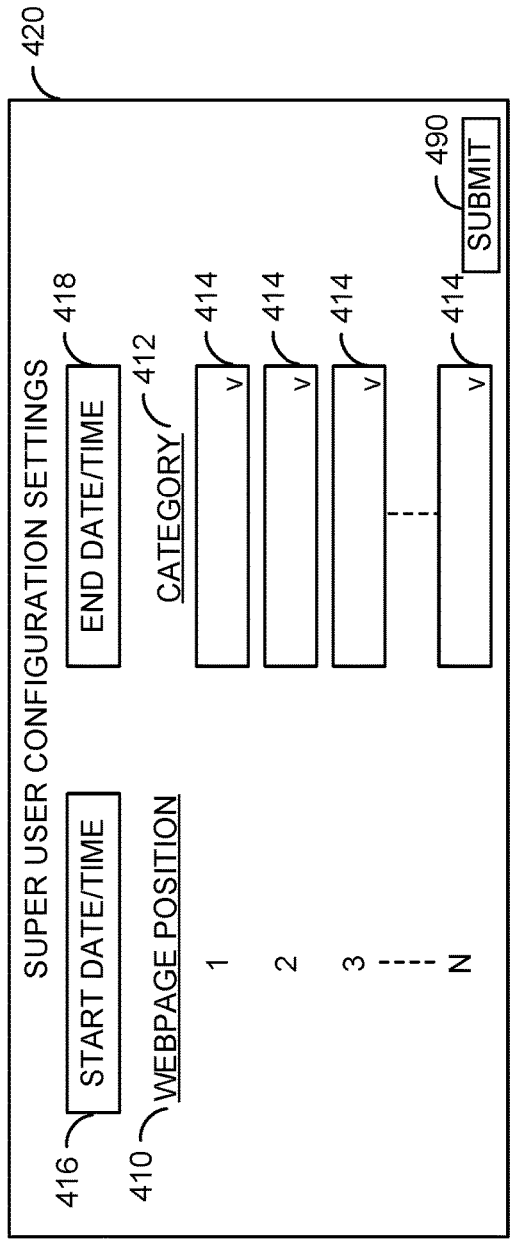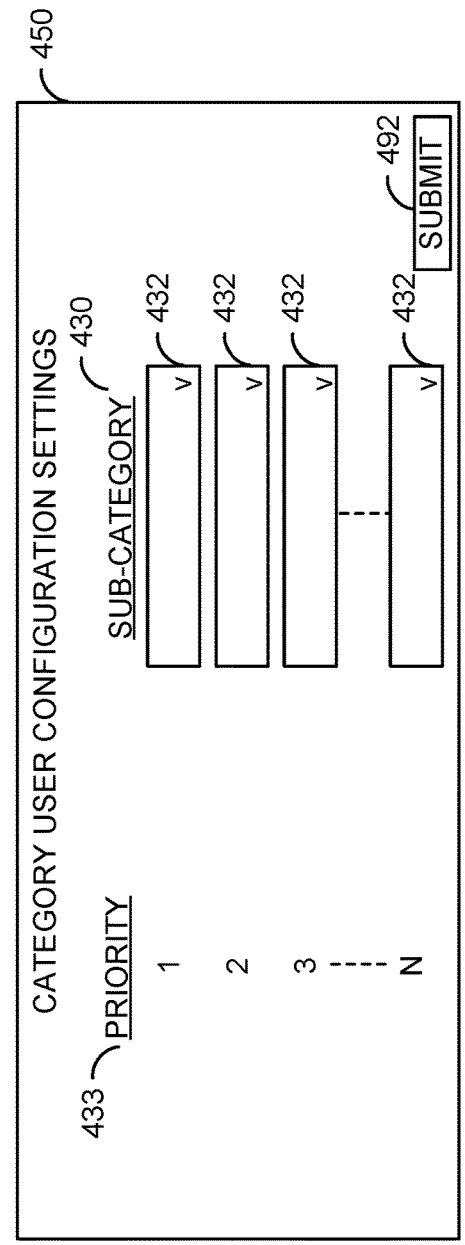
FIG. 4A
FIG. 4B

METHODS AND APPARATUS FOR PROVIDING DIGITAL ITEM ADVERTISEMENTS

TECHNICAL FIELD

The disclosure relates generally to digital advertisements and, more specifically, to electronically determining and providing digital item advertisements on display interfaces such as webpages.

BACKGROUND

At least some websites, such as retailer websites, display item advertisements. For example, a website may display item advertisements, and may further allow a customer to purchase advertised items. The displayed advertisements may be determined by advertisement recommendation systems, which may attempt to provide advertisements for items which the customer may be interested in. In some examples, however, the advertisement recommendation systems may provide advertisements for items that the customer finds irrelevant or is not interested in. In other examples, the advertisement recommendation systems may provide advertisements for items that may be out of stock.

As a result, a retailer may lose sales of items to a customer. For example, the customer may not buy the advertised item. In addition, the customer may leave the website without having purchased an item that, if shown an advertisement for, the customer would have purchased. In some examples, the customer may go elsewhere, such as another website, to make purchases. As such, there are opportunities to address advertisement recommendation systems.

SUMMARY

The embodiments described herein are directed to automatically determining and providing digital item advertisements that may be displayed, for example, on a website. The embodiments may allow a person, such as a customer, to be presented with advertisements that may be more likely to interest the person, such as during a holiday. For example, the embodiments may allow the person to view advertisements that the person may be more willing to purchase during a holiday season, such as a "hot" item.

For example, the embodiments may enable taxonomy of shelves where the lowest level shelves may identify items for advertisement and higher-level shelves (e.g., "supershelves") may identify item categories (e.g., rather than identifying items) and be mapped (e.g., linked) to lower level shelves. These interconnected shelves may enable a large merchandising organization (e.g., retailer) to identify item advertisements for specialized category or event-specific (e.g., holidays, sales) webpages that then feed into more general campaign-specific webpages without having to, for example, share spreadsheets and manually curate items among groups of an organization.

In some examples, the embodiments enable a retailer to strategically place item advertisements on a webpage, such as a home page or a category page, in an attempt to maximize revenues for a retailer. For example, the embodiments may allow a retailer to prioritize item advertisements over a period of time (e.g., during a sale, such as a year-end sale, a holiday season, or during any other period), and further may allow various groups of the retailer to prioritize item advertisements for items within each group. The embodiments may display item advertisements on the webpage based on the priorities. For example, the embodiments may allow a retailer's grocery group to prioritize grocery item advertisements, and further allow the retailer's clothing group to prioritize clothing item advertisements. The embodiments may further enable the retailer to determine which group can advertise items within a space (e.g., real estate) of a webpage, such as a home page of a retailer's website.

In some examples, the embodiments may determine that an item associated with an item advertisement to be displayed is out of stock and, in response, determine instead (e.g., for display) an item advertisement for an item different than the out of stock item. For example, the embodiments may determine that a higher priority item advertisement for a first item is out of stock, and may determine whether the next highest priority item advertisement for a second item is out of stock. If the second item is in stock, the embodiments may display the item advertisement for the second item. Otherwise, if the second item is not in stock, the embodiments may continue to search for item advertisements in accordance with established priorities to determine the item advertisement to display.

Among other advantages, the embodiments may allow a retailer to present more relevant item advertisements to each person, thereby increasing the chances that the person will purchase the advertised items. In addition, because a person may now spend less time reviewing irrelevant advertisements, the person may have additional time to consider additional items for purchase. Moreover, the embodiments may allow a retailer to place relevant item advertisements strategically across available real estate of a webpage, thereby increasing the chances of potential sales (and thus revenue). In addition to or instead of these example advantages, persons of ordinary skill in the art having the benefit of these disclosures would recognize and appreciate other advantages as well.

In some embodiments, a system comprises a computing device configured to receive item advertisement data identifying a plurality of items to advertise for each of a plurality of item categories. The computing device may also be configured to receive an item category for each of a plurality of positions of a display interface. Further, the computing device may be configured to determine, for each position of the plurality of positions of the display interface, an item advertisement based on the item category for the position and the item advertisement data. The computing device may also be configured to generate display interface position data identifying the item advertisement determined for each of the plurality of positions of the display interface. The computing device may also be configured to transmit the display interface position data. For example, the computing device may transmit the display interface position data to a webserver. The webserver may then display the item advertisements identified by the display interface position data.

In some embodiments, a computing device is configured to receive a prioritized list of item advertisements for each of a plurality of item categories. The computing device is also configured to receive an item category for each of a plurality of positions of a display interface. Each item category may correspond to one or more of the plurality of item categories, for example. Further, the computing device is configured to determine, for each position of the plurality of positions of the display interface, an item advertisement based on the item category for the position and the prioritized list of item advertisements. The computing device is also configured to generate display interface position data identifying the item advertisement determined for each position of the plurality of positions of the display interface. The computing device is further configured to transmit the display interface position data to a web server.

In some embodiments, a computing device is configured to receive a plurality of item advertisement recommendations for a period of time. The computing device is also configured to determine a first item category for each of the item advertisement recommendations. Further, the computing device is configured to receive a second item category for each of a first level of shelves, and a receive a third item category for each of a second level of shelves. The computing device is configured to determine a mapping between the first level of shelves and the second level of shelves based on the second item categories and the third item categories. Further, the computing device is configured to determine an item advertisement for each of a plurality of positions of a display interface based on the first item categories and the mapping. The computing device is also configured to display the item advertisements on the display interface based on the plurality of positions.

In some embodiments, a method by one or more computing devices includes receiving item advertisement data identifying a plurality of items to advertise for each of a plurality of item categories. The method also includes receiving an item category for each of a plurality of positions of a display interface. Further, the method includes determining, for each position of the plurality of positions of the display interface, an item advertisement based on the item category for the position and the item advertisement data. The method also includes generating display interface position data identifying the item advertisement determined for each of the plurality of positions of the display interface. The method further includes transmitting the display interface position data. For example, the method may include transmitting the display interface position data to a webserver. The webserver may then display the item advertisements identified by the display interface position data.

In some embodiments, a method by one or more computing devices includes receiving a prioritized list of item advertisements for each of a plurality of item categories. The method also includes receiving an item category for each of a plurality of positions of a display interface. Each item category may correspond to one or more of the plurality of item categories, for example. Further, the method includes determining, for each position of the plurality of positions of the display interface, an item advertisement based on the item category for the position and the prioritized list of item advertisements. The method also includes generating display interface position data identifying the item advertisement determined for each position of the plurality of positions of the display interface. The method further includes transmitting the display interface position data to a web server.

In some embodiments, a method by one or more computing devices includes receiving a plurality of item advertisement recommendations for a period of time. The method also includes determining a first item category for each of the item advertisement recommendations. Further, the method includes receiving a second item category for each of a first level of shelves, and a receiving a third item category for each of a second level of shelves. The method includes determining a mapping between the first level of shelves and the second level of shelves based on the second item categories and the third item categories. Further, the method includes determining an item advertisement for each of a plurality of positions of a display interface based on the first item categories and the mapping. The method further includes displaying the item advertisements on the display interface based on the plurality of positions.

In some embodiments, a non-transitory computer readable medium has instructions stored thereon, where the instructions, when executed by at least one processor, causes the at least one processor to perform operations including receiving item advertisement data identifying a plurality of items to advertise for each of a plurality of item categories. The operations also include receiving an item category for each of a plurality of positions of a display interface. Further, the operations include determining, for each position of the plurality of positions of the display interface, an item advertisement based on the item category for the position and the item advertisement data. The operations also include generating display interface position data identifying the item advertisement determined for each of the plurality of positions of the display interface. The operations further include transmitting the display interface position data. For example, the operations may include transmitting the display interface position data to a webserver. The webserver may then display the item advertisements identified by the display interface position data.

In some embodiments, a non-transitory computer readable medium has instructions stored thereon, where the instructions, when executed by at least one processor, causes the at least one processor to perform operations including receiving a prioritized list of item advertisements for each of a plurality of item categories. The operations also include receiving an item category for each of a plurality of positions of a display interface. Each item category may correspond to one or more of the plurality of item categories, for example. Further, the operations include determining, for each position of the plurality of positions of the display interface, an item advertisement based on the item category for the position and the prioritized list of item advertisements. The operations also include generating display interface position data identifying the item advertisement determined for each position of the plurality of positions of the display interface. The operations further include transmitting the display interface position data to a web server.

In some embodiments, a non-transitory computer readable medium has instructions stored thereon, where the instructions, when executed by at least one processor, causes the at least one processor to perform operations including receiving a plurality of item advertisement recommendations for a period of time. The operations also include determining a first item category for each of the item advertisement recommendations. Further, the operations include receiving a second item category for each of a first level of shelves, and a receiving a third item category for each of a second level of shelves. The operations include determining a mapping between the first level of shelves and the second level of shelves based on the second item categories and the third item categories. Further, the operations include determining an item advertisement for each of a plurality of positions of a display interface based on the first item categories and the mapping. The operations further include displaying the item advertisements on the display interface based on the plurality of positions.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein:

FIG. 4A illustrates a super shelf configuration graphical user interface (GUI) in accordance with some embodiments;

FIG. 4B illustrates a category configuration GUI in accordance with some embodiments;

DETAILED DESCRIPTION

Figure 1:
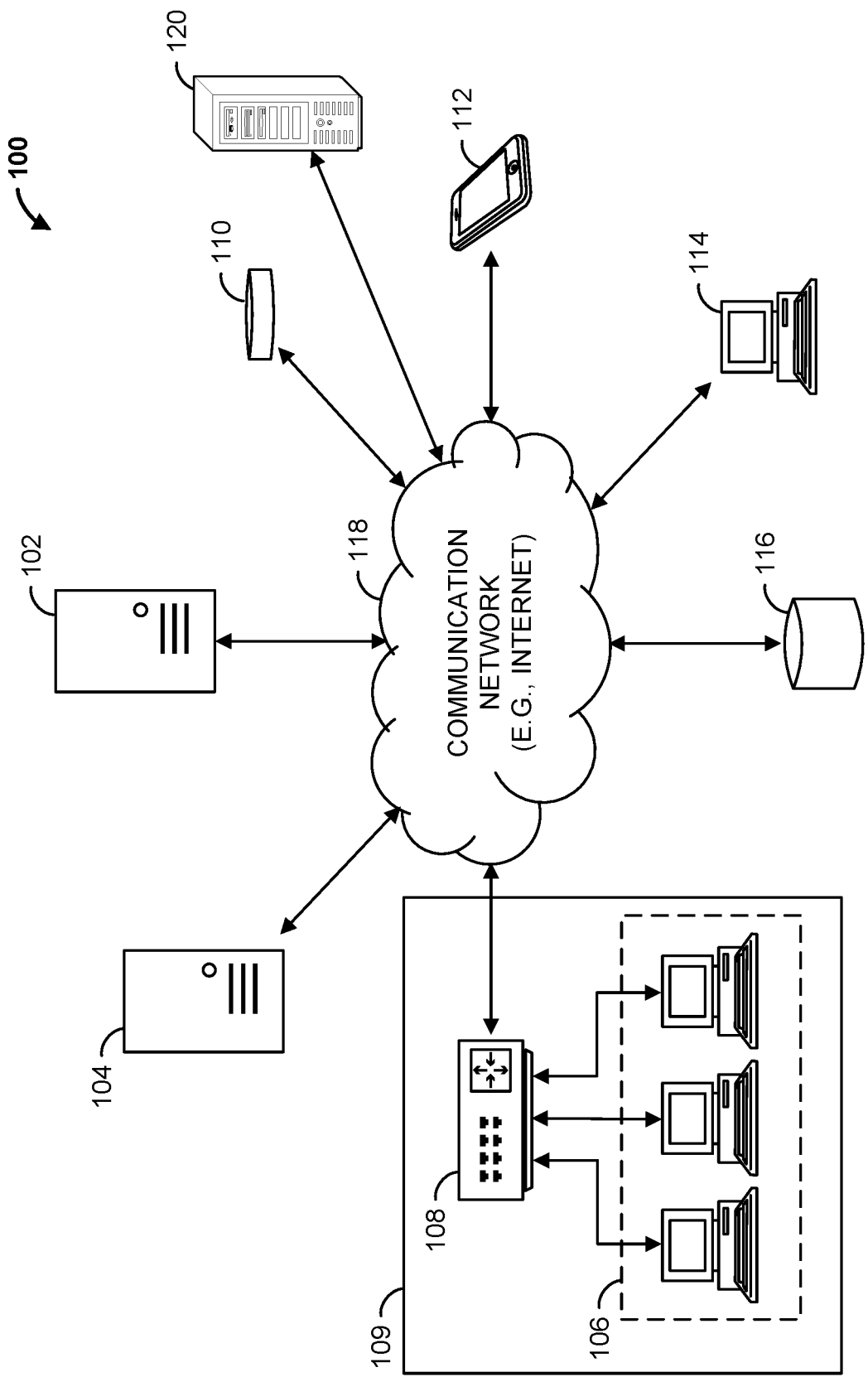
FIG. 1 is a block diagram of an item advertisement determination system in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Moreover, while the below embodiments may include providing of item advertisements for display a webpage, the embodiments are merely exemplary. For example in some embodiments, the item advertisements may be provided to any suitable display interface (e.g., a display interface to one or more of: a monitor, an LCD screen, a digital display device, a display on a mobile device, or any other suitable display).

Turning to the drawings, FIG. 1 illustrates a block diagram of an item advertisement determination system 100 that includes an item advertisement determination computing device 102 (e.g., a server), a web server 104, workstation(s) 106, database 116, item recommendation device 120, and multiple customer computing devices 110, 112, 114 operatively coupled over network 118. Item advertisement determination computing device 102, workstation(s) 106, web server 104, item recommendation device 120, and multiple customer computing devices 110, 112, 114 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit data to, and receive data from, communication network 118.

In some examples, each of item advertisement determination computing device 102 and item recommendation device 120 can be a computer, a workstation, a laptop, a server such as a cloud-based server, or any other suitable device. In some examples, web server 104 can be a server, a web server, a cloud-based server, or any suitable computing device that can host one or more webpages. In some examples, each of multiple customer computing devices 110, 112, 114 can be a cellular phone, a smart phone, a tablet, a personal assistant device, a voice assistant device, a digital assistant, a laptop, a computer, or any other suitable device. In some examples, item advertisement determination computing device 102 and web server 104 are operated by a retailer, item recommendation device 120 is operated by a third-party, and multiple customer computing devices 110, 112, 114 are operated by customers of the retailer.

Although FIG. 1 illustrates three customer computing devices 110, 112, 114, item advertisement determination system 100 can include any number of customer computing devices 110, 112, 114. Similarly, item advertisement determination system 100 can include any number of item advertisement determination computing devices 102, item recommendation devices 120, workstation(s) 106, web servers 104, and databases 116.

Item advertisement determination computing device 102 is operable to communicate with database 116 over communication network 118. For example, item advertisement determination computing device 102 can store data to, and read data from, database 116. Database 116 can be a remote storage device, such as a cloud-based server, a disk (e.g., a hard disk), a memory device on another application server, a networked computer with memory, or any other suitable storage device. Although shown remote to item advertisement determination computing device 102, in some examples, database 116 can be a local storage device, such as a hard drive, a non-volatile memory, or a USB stick. In some examples, item advertisement determination computing device 102 stores webpage configuration settings in database 116. The configuration settings may include, for example, categories and sub-categories of items for item advertisements that may be displayed on a webpage, for example.

Communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet. For example, item advertisement determination computing device 102 may communicate with each of web server 104 and with item recommendation devices 120 over communication network 118. Similarly, customer computing devices 110, 112, 144 can communicate with web server 104 over communication network 118.

In some examples, web server 104 hosts one or more web pages, such as a retailer's website. For example, web server 104 may host an online marketplace where customers may view and purchase items. The webpages may include a homepage, one or more category webpages, and/or one or more item-detail pages (IDPs) (e.g., product-detail pages (PDPs)). Each webpage may include one or more item advertisements. Each item advertisement may include, for example, one or more of an item image, an item description, an item price, item options (e.g., colors, quantity, sizes, etc.), and item reviews. Customers may, via customer computing devices 110, 112, 114 communicating with web server 104 over communication network 118, visit the webpages and view the item advertisements.

Figure 3:
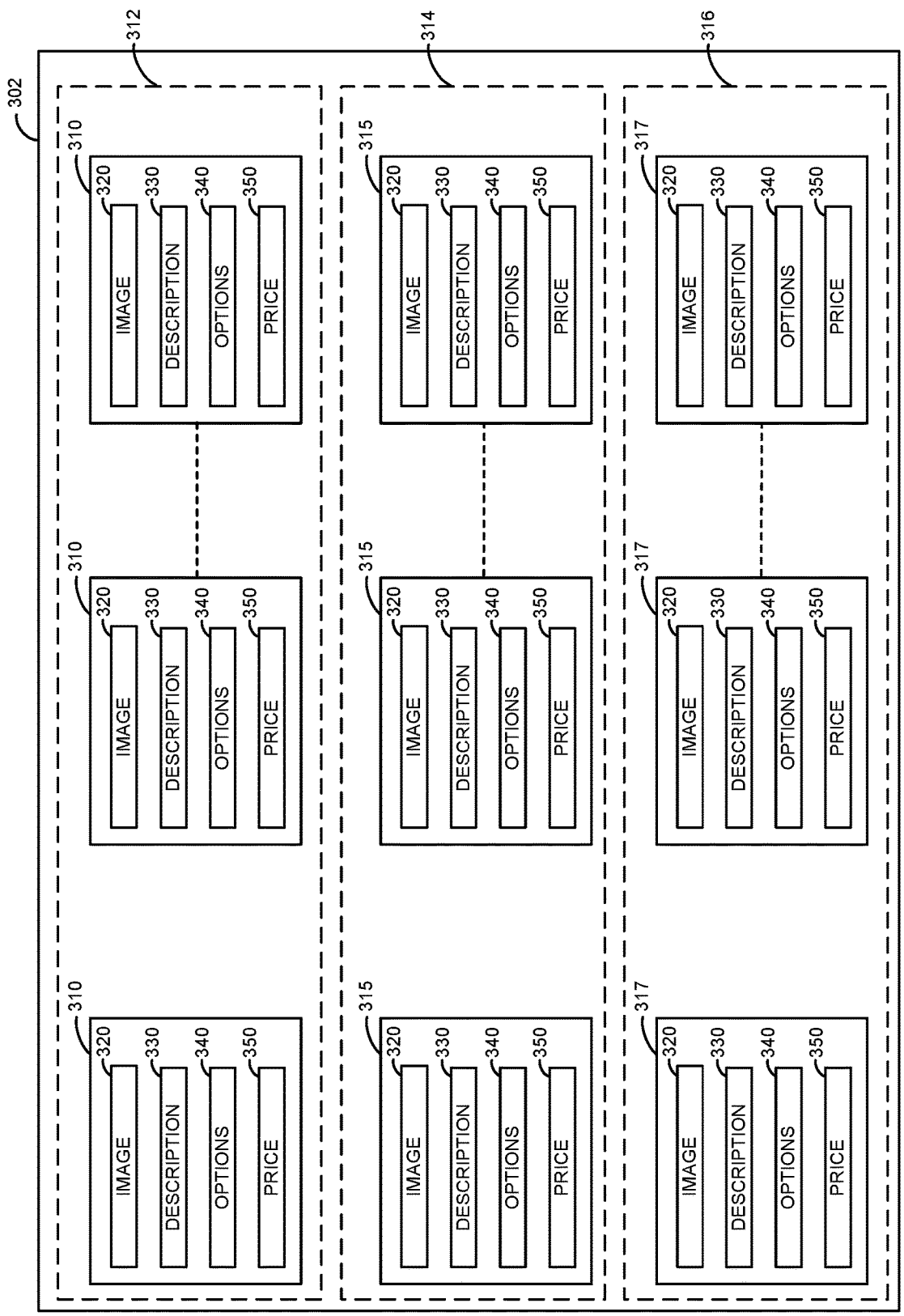
FIG. 3 illustrates a webpage with item advertisements in accordance with some embodiments.

For example, FIG. 3 illustrates a webpage 302 that includes multiple item advertisements 310, 315, 317. Each item advertisement 310, 315, 317 includes an item image 320, an item description 330, item options 340, and an item price 350. In this example, item advertisements 310 are displayed along a first row 312 of webpage 302. Item advertisements 315 are displayed along a second row 314, and item advertisements 317 are displayed along a third row of webpage 302. As described herein, item advertisement determination computing device 102 may determine the item advertisements 311, 315, 317 to display based on a taxonomy of configuration "shelves," where lower shelves are mapped to higher shelves. In some examples, lowest level shelves identify a prioritized list of item advertisements within a category. The prioritized list of item advertisements may be received from item recommendation device 120, for example. Higher level shelves are then mapped to lower level shelves (e.g., via one or more intermediate shelves) based on the category of items of the lowest level shelves. In some examples, each of the lower level shelves are configured with a prioritized list of item advertisements, and higher level shelves are configured to map to one or more of the lowest level shelves to generate a campaign.

Referring back to FIG. 1, customers may purchase items, such as advertised items, via the website (e.g., webpage 302). For example, the website may provide an "add-to-cart" icon that, when engaged (e.g., clicked on) by the customer, facilitates the placement of items into an online shopping cart. In some examples, a customer may engage an item advertisement and, in response, the website may redirect the customer to a webpage that includes an add-to-cart icon to place the item into an online shopping cart for the customer. The website may further provide a "checkout" icon that facilitates the purchase of the items in the online shopping cart.

Figure 2:
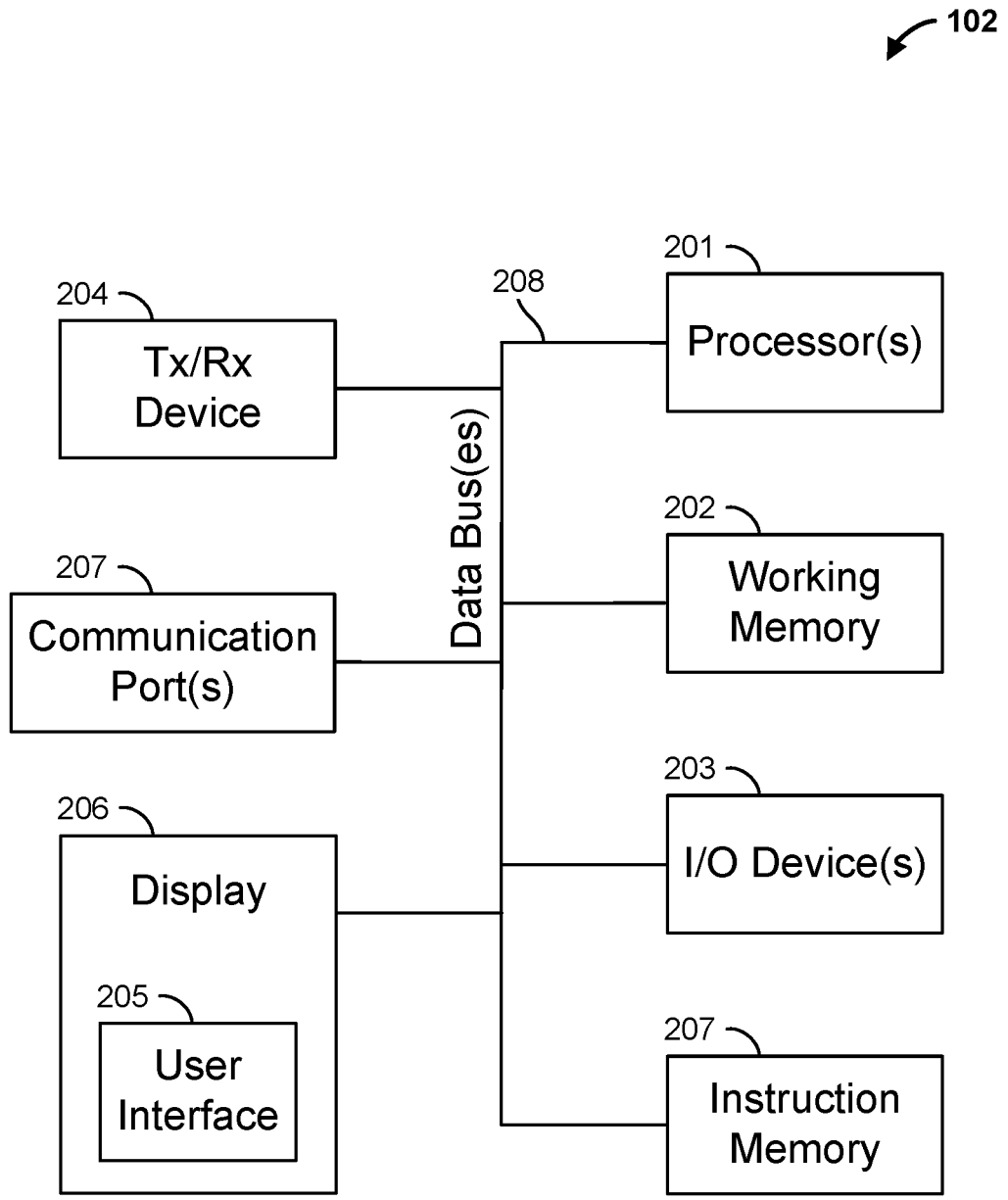
FIG. 2 is a block diagram of an item advertisement determination computing device of the item advertisement determination system of FIG. 1 in accordance with some embodiments.

FIG. 2 illustrates the item advertisement determination computing device 102 of FIG. 1. Item advertisement determination computing device 102 can include one or more processors 201, working memory 202, one or more input/output devices 203, instruction memory 207, a transceiver 204, one or more communication ports 209, and a display 206, all operatively coupled to one or more data buses 208. Data buses 208 allow for communication among the various devices. Data buses 208 can include wired, or wireless, communication channels.

Processors 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory. Processors 201 can be configured to perform a certain function or operation by executing code, stored on instruction memory 207, embodying the function or operation. For example, processors 201 can be configured to execute code stored in instruction memory 207 to perform one or more of any function, method, or operation disclosed herein.

Additionally processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of item advertisement determination computing device 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 209 can include, for example, a serial port such as a universal asynchronous receiver/transmitter (UART) connection, a Universal Serial Bus (USB) connection, or any other suitable communication port or connection. In some examples, communication port(s) 209 allows for the programming of executable instructions in instruction memory 207. In some examples, communication port(s) 209 allow for the transfer (e.g., uploading or downloading) of data, such as shelf configuration data.

Display 206 can display user interface 205. User interfaces 205 can enable user interaction with item advertisement determination computing device 102. For example, user interface 205 can be a user interface for an application of a retailer that allows a customer to view and interact with a retailer's website. In some examples, a user can interact with user interface 205 by engaging input-output devices 203. In some examples, display 206 can be a touchscreen, where user interface 205 is displayed on the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 item advertisement determination computing device 102 will be operating in. Processor(s) 201 is operable to receive data from, or send data to, a network, such as communication network 118 of FIG. 1, via transceiver 204.

Referring back to FIG. 3, in some examples, item advertisement determination computing device 102 determines the item advertisements 311, 315, 317 to display on webpage 302 based on configuration settings for each position of each item advertisement 311, 315, 317. The configuration settings may be based on categories, and sub-categories, of items. As an example, a category of items may be "fruits," and sub-categories of fruit items may include "apples," "oranges," or "bananas." In some examples, item sub-categories may differentiate from each other based on an item's type (e.g., 1% milk, 2% milk, whole milk, etc.). In some examples, item sub-categories may differentiate from each other based on an item's brand.

Item advertisement determination computing device 102 may provide for display one or more sub-category user configuration settings webpages, one or more category user configuration settings webpages, and one or more super user configuration settings webpages where a user may provide the configuration settings. Item advertisement determination computing device 102 may store the configuration settings in any suitable storage device, such as database 116.

For example, item advertisement determination computing device 102 may provide (e.g., for display) a sub-category user configuration settings webpage that allows a user to configure a prioritized list of item advertisements for items in a particular sub-category of items. The sub-category user configuration settings webpage may allow a user to identify and prioritize item level advertisements, such as item advertisements 311, 315, 317 for specific items. For example, the sub-category user configuration settings webpage may allow the user to select a first item, such as apples of a first brand, and a second item, such as apples of a second brand, for advertising. Each selection may correspond to a specific item advertisement 311, 315, 317. In some examples, each selection corresponds to a plurality of item advertisements 311, 315, 317 for a same item. Further, in some examples, the sub-category user configuration settings webpage allows the user to assign a priority to each of the first item and the second item. For example, the user may prioritize the first item over the second item.

In some examples, rather than being configured by a user within the sub-category user configuration settings webpage, one or more prioritized lists of item advertisements for corresponding sub-categories may be received from item recommendation device 120. In some examples, the sub-category user configuration settings webpage may allow a user to edit the received prioritized list of item advertisements by, for example, changing priorities of the various item advertisements.

Item advertisement determination computing device 102 may further provide a category user configuration settings webpage that allows a user to configure a prioritized list of item sub-categories. For example, the category user configuration settings webpage may allow a user to prioritize a first sub-category of a particular category over a second sub-category of the same particular category. Merely as an example, the category user configuration settings webpage for a category of "fruits" may allow the user to prioritize the sub-category of "apples" over the sub-category of "bananas." Each of the selectable sub-categories may correspond to a sub-category associated with a sub-category user configuration settings webpage.

Item advertisement determination computing device 102 may also provide a super user configuration settings webpage that allows a "super user" to select a category of items to advertise in each of a plurality of locations on a webpage, such as webpage 302. For example, the a super user configuration settings webpage may allow a user to select a category of "fruits" for a first position of webpage 302, a category of "vegetables" for a second position of webpage 302, and a category of "meats" for a third position of webpage 302. Each of the selectable categories may correspond to a category associated with a category user configuration settings webpage.

Based on the configurations settings provided by the sub-category user configuration settings webpages, the category user configuration settings webpages, and the super user configuration settings webpage, item advertisement determination computing device 102 may determine item advertisements for each of a plurality of positions of webpage 302. For example, item advertisement determination computing device 102 may determine a first category of items to advertise for a first position of webpage 302, such as a position as defined by the item advertisement 311 at a first column of first row 312, based on a category identified for the position as selected by the user within the super user configuration settings webpage.

Based on the first category of items identified, item advertisement determination computing device 102 may determine one of a plurality of sub-category of items to advertise in the first position based on selections made within a category user configuration settings webpage corresponding to the first category of items. For example, if the first category is "fruits," item advertisement determination computing device 102 may determine a sub-category of items to advertise in the first position based on the category user configuration settings webpage for "fruits."

In some examples, item advertisement determination computing device 102 may determine a highest prioritized sub-category of items to advertise as configured within the category user configuration settings webpage for the category of items (e.g., "fruits"). For example, item advertisement determination computing device 102 may determine that a first sub-category of items (e.g., "apples") is of higher priority than a second sub-category of items (e.g., "bananas"). As such, item advertisement determination computing device 102 may select the first sub-category of items.

Further, item advertisement determination computing device 102 may determine the item advertisement to display within the first position based on the selections made within the sub-category user configuration settings webpage for the selected sub-category of items. For example, if item advertisement determination computing device 102 determined that the first sub-category of items was "apples", item advertisement determination computing device 102 selects the item advertisement to display for the first position based on the sub-category user configuration settings (e.g., as provided by the corresponding sub-category user configuration setting webpage) corresponding to "apples." In some examples, item advertisement determination computing device 102 selects the highest prioritized item advertisement.

In some examples, item advertisement determination computing device 102 determines whether the item corresponding to the highest prioritized item advertisement is available for purchase. For example, item advertisement determination computing device 102 may determine whether the item is in stock (e.g., and/or available for delivery) based on inventory data, which may be stored within database 116. If the item is in stock, item advertisement determination computing device 102 provides the item advertisement determination computing device 102 for display.

Otherwise, if the item is not in stock or otherwise available for purchase, item advertisement determination computing device 102 determines the next highest prioritized item advertisement. Similarly, item advertisement determination computing device 102 may determine whether the item corresponding to the next highest prioritized item advertisement is in stock (e.g., and/or available for delivery). If the next highest prioritized item advertisement is in stock and available for delivery, item advertisement determination computing device 102 provides the next highest prioritized item advertisement determination computing device 102 for display. If the item corresponding to next highest prioritized item advertisement is not in stock, item advertisement determination computing device 102 continues with determining the availability of the next highest prioritized item advertisements until an item advertisement is identified.

In some examples, if all items associated with item advertisements for a sub-category of items are out of stock (e.g., and/or not available for delivery), item advertisement determination computing device 102 provides the item advertisement for the highest prioritized item advertisement (which was determined to be out of stock).

In some examples, if all items associated with item advertisements for a sub-category of items are out of stock (e.g., and/or not available for delivery), item advertisement determination computing device 102 determines the next highest priority sub-category of items to advertise as configured within the same category user configuration settings webpage for the same category of items. For example, in continuing the example from above, item advertisement determination computing device 102 may determine item advertisements based on the second sub-category of items (e.g., "bananas") identified by the selections made within the category user configuration settings webpage, as described herein.

In some examples, when displaying a webpage, such as webpage 302, that includes one or more item advertisements, web server 104 may obtain item display order data from item advertisement determination computing device 102. The item display order data may identify an item advertisement to display at each of a plurality of positions of webpage 302, where the item advertisements are determined as described herein.

Figure 4C:
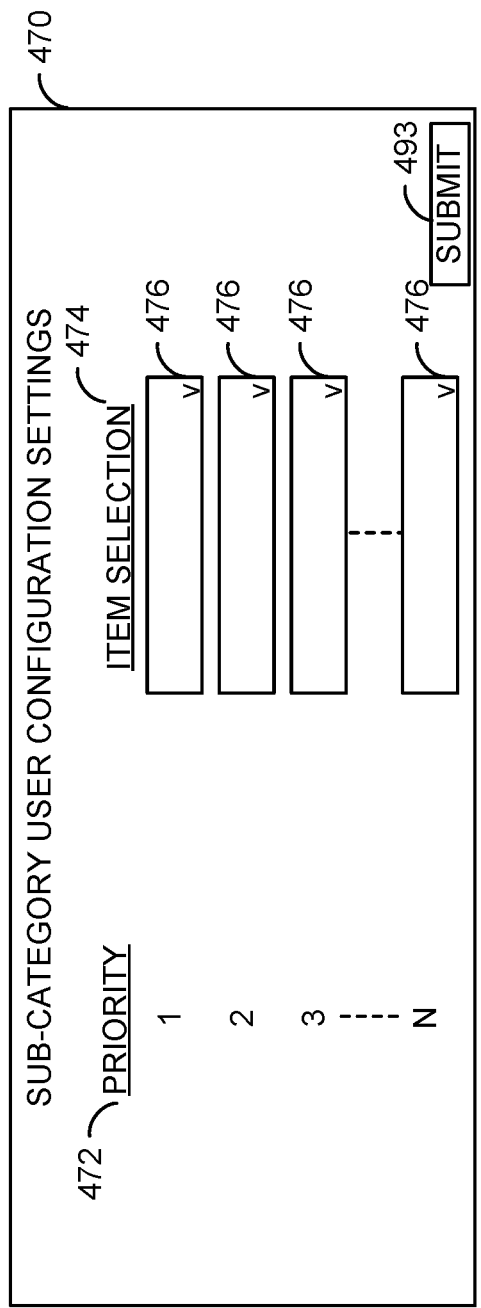
FIG. 4C illustrates a sub-category configuration GUI in accordance with some embodiments.

FIGS. 4A, 4B, and 4C illustrate configuration graphical user interfaces (GUIs) that may be generated and provided by item advertisement determination computing device 102. Specifically, FIG. 4A illustrates a super user configuration GUI 420, FIG. 4B illustrates a category user configuration settings GUI 450, and FIG. 4C illustrates a sub-category user configuration settings GUI 470. A user may provide configuration settings via the GUIs and, in response, item advertisement determination computing device 102 may store each of the corresponding configuration settings within a storage device, such as database 116. Each of super user configuration GUI 420, category user configuration settings GUI 450, and sub-category user configuration settings GUI 470 may correspond to a level of "shelving." For example, super user configuration GUI 420 may correspond to a highest shelf level in a taxonomy (e.g., hierarchy) of shelving, category user configuration settings GUI 450 may correspond to a next highest shelf level in the taxonomy of shelving, and sub-category user configuration settings GUI 470 may correspond to a lowest shelf level in the taxonomy of shelving. Although three levels of shelves are illustrated in this example, in other examples, any other number of shelves may be generated. For example, a plurality of intermediate shelves may be employed, where each lower level is a sub-category, or sub-type, of a higher level.

Item advertisement determination computing device 102 may generate mapping data that identifies a mapping of super user configuration GUI 420 to one or more category user configuration settings GUIs 450. The mapping data may further identify a mapping of each of the category user configuration settings GUIs 450 to one or more sub-category user configuration settings GUIs 470. As such, the mapping data may identify and characterize the taxonomy of shelving. For example, the mapping data may identify and characterize an interconnection between the various levels of shelves. Item advertisement determination computing device 102 may store the mapping data in database 116. Item advertisement determination computing device 102 may determine item advertisements for display within a webpage, such as within webpage 302, based on the mapping data.

FIG. 4A illustrates the super user configuration GUI 420, which may allow a user to configure item categories of item advertisements to display in each of a plurality of positions of a webpage, such as webpage 302. The user may be, for example, a higher level manager of a retailer. In this example, super user configuration GUI 420 includes a plurality of webpage positions 410 and corresponding selectable item categories 412. Each selectable item category includes an entry box 414 to select an item category 412 for each webpage position 410. For example, entry box 414 may be a drop down menu (e.g., allowing a selection of a plurality of preconfigured item categories), a text entry box, or any other suitable mechanism of allowing a user to identify an item category 412 for the corresponding webpage position 410. After providing an item category in each entry box 414, the user may engage (e.g., click, select, etc.) submit icon 490, which causes item advertisement determination computing device 102 to store the identified item categories 412 (e.g., configuration settings) to a storage device such as database 116.

In this example, each webpage position 410 may correspond to an item advertisement position along a row of item advertisements within a webpage. In some examples, each webpage position 410 may correspond to any webpage item advertisement position (e.g., webpage real estate) among one or more webpages.

In some examples, each webpage position 410 corresponds to webpage positions of a webpage in a left to right, top to bottom configuration. For example, webpage 302 illustrates three item advertisement positions for corresponding item advertisements 311 along first row 312. Webpage 302 also illustrates three item advertisement positions for corresponding item advertisements 315 along second row 314, and three item advertisement positions for corresponding item advertisements 317 along third row 316. The first webpage position 410 may correspond to an item advertisement position at a first column of first row 312 of webpage 302. Similarly, the second webpage position 410 may correspond to an item advertisement position at a second column of first row 312 of webpage 302, and the third webpage position 410 may correspond to an item advertisement position at a third column of first row 312 of webpage 302. The fourth webpage position 410 may correspond to an item advertisement position at a first column of second row 314 of webpage 302, and so on.

Super user configuration GUI 420 also includes start date/time entry box 416 and end date/time entry box 418, each of which may allow a user to select or enter a date. For example, each of start data/time icon 416 and end date/time icon 418 may allow a user to select a date and a time. Item advertisement determination computing device 102 may provide item advertisements for webpage positions 410 in accordance with item categories 412 based on the dates and/or times associated with each of start date/time entry box 416 and end date/time entry box 418.

For example, a user may provide first configuration settings via super user configuration GUI 420 while specifying a first period of time (e.g., via start date/time entry box 416 and end date/time entry box 418), and may provide second configuration settings via super user configuration GUI 420 while specifying a second period of time. The first period of time may correspond to a period of time where no sales are being held, and the second period of time may correspond to a holiday season where sales are being held, for example.

In some examples, item advertisement determination computing device 102 may provide item advertisements in accordance with either the first configuration settings or the second configuration settings based on a current date and/or time. For example, item advertisement determination computing device 102 may determine whether the current date and/or time falls within the first period of time, or the second period of time. Item advertisement determination computing device 102 may provide item advertisements for each position of a webpage based on the first configuration settings if the current date and/or time falls within the first period of time. Otherwise, if the current date and/or time falls within the second period of time, item advertisement determination computing device 102 may provide item advertisements for each position of the webpage based on the second configuration settings. In some examples, one of at least the first period of time and the second period of time includes a holiday. In some examples, one of at least the first period of time and the second period of time includes a sale, such as a clearance sale, end of year sale, or any other suitable sale.

In some examples, item advertisement determination computing device 102 determines the configuration settings to use to determine the item advertisements based on a date and/or time identified in an item advertisement request received from a web server, such as web server 104. For example, item advertisement determination computing device 102 may receive an item advertisement request for item advertisements. The item advertisement request may further identify a date and/or time. Item advertisement determination computing device 102 may determine item advertisements for a plurality of webpage positions for the identified date and/or time as described herein, and may generate webpage position data identifying the item advertisements for the plurality of webpage positions. Item advertisement determination computing device 102 may further transmit the webpage position data to the web server. The web server may then display the item advertisements in accordance with the received webpage position data.

FIG. 4B illustrates the category user configuration settings GUI 450, which may allow a user to prioritize item sub-categories of item advertisements which may be displayed in each of the plurality of positions of the webpage. The user may be, for example, a manager of a category of items for a retailer. In some examples, a user configures a plurality of category user configuration settings GUIs 450, where each of category user configuration settings GUI 450 corresponds to a different category of items.

In this example, category user configuration settings GUI 450 includes a plurality of selectable item sub-categories 430 with a corresponding priority 433. Each of the plurality of selectable item sub-categories 430 is associated with an entry box 432 where a user may enter or select a sub-category to associate with the corresponding priority 433. For example, a highest priority (e.g., "1") may correspond to the first entry box 432, a second highest priority (e.g., "2") may correspond to the second entry box 432, and so on.

Upon selecting each of the sub-categories 430, a user may engage the submit icon 492. In response, item advertisement determination computing device 102 may store the item sub-categories 430 in database 116.

As an example, assume a user selects a category of "fruits" within entry box 414 of a first category 412 associated with a first webpage position 410 of super user configuration GUI 420. Item advertisement determination computing device 102 may determine category configuration settings stored within database 116 based on a category user configuration settings GUI 450 that corresponds to "fruits." Item advertisement determination computing device 102 may further determine the highest priority sub-category 430 configured within the category user configuration settings, such as "apples," and determine if any items corresponding to "apples" are in stock (e.g., for a web based purchase, or an in-store 109 based purchase). If any "apples" are in stock, item advertisement determination computing device 102 determines an item advertisement for the first webpage position based on item advertisements for available "apples" (as configured with sub-category user configuration settings GUI 470 for "apples" described below with respect to FIG. 4C). Otherwise, if no "apples" are in stock, item advertisement determination computing device 102 determines an item advertisement for the first webpage position based on the next highest priority sub-category 430 associated with an in-stock item.

FIG. 4C illustrates the sub-category user configuration settings GUI 470, which may allow a user to prioritize items associated with item advertisements that may be displayed in each of the plurality of positions of the webpage. The user may be, for example, a person responsible for a sub-category of items for a retailer. In some examples, each category user configuration settings GUI 450 is associated with a plurality of sub-category user configuration settings GUIs 470. For example, each selectable sub-category 430 of a category user configuration settings GUI 450 may have a corresponding sub-category user configuration settings GUI 470.

In this example, sub-category user configuration settings GUI 470 includes a plurality of item selections 474, each item selection 474 associated with a corresponding priority 472. A user may select an item selection to associate with each priority 472 by entering or selecting an item (or item advertisement) within entry box 476. The user may cause item advertisement determination computing device 102 to store the item selections 474 to a storage device, such as database 116, by engaging submit icon 493.

In some examples, item advertisement determination computing device 102 selects a highest priority item selection 474 for a sub-category corresponding to sub-category 430 provided by a category user configuration settings GUI 450, and determines if the corresponding item is in stock (e.g., for web based purchases, or for in-store 109 purchases). If the item is in stock, item advertisement determination computing device 102 provides an item advertisement for the item in a corresponding webpage position 410. Otherwise, if the item is not in stock, item advertisement determination computing device 102 determines an item advertisement for the next highest priority item selection 474.

Merely as an example, assume a user selects "fruits" within an category 412 entry box 414 of super user configuration GUI 420, which corresponds to a first webpage position 410 of a webpage 302 (e.g., top-left item advertisement display position). To determine the item advertisement to provide for the first webpage position 410, item advertisement determination computing device 102 may determine category user configuration settings (e.g., stored within database 116) as provided by a user within a category user configuration settings GUI 450 corresponding to "fruits." Item advertisement determination computing device 102 may then determine the highest prioritized 433 item sub-category 430 as indicated by the determined category user configuration settings (e.g., as stored in database 116). For example, item advertisement determination computing device 102 may determine that "bananas" is the highest prioritized item sub-category 430 within the category of "fruits." Item advertisement determination computing device 102 may further determine a highest prioritized item selection 474 for the sub-category of "bananas" based on sub-category user configuration settings provided by a sub-category user configuration settings GUI 470 corresponding to "bananas," and further determine an item advertisement based on the highest prioritized item selection 474. Item advertisement determination computing device 102 may further generate webpage position data identifying and characterizing the item advertisement and corresponding first webpage position 410, and may transmit the webpage position data to a web server, such as web server 104. Item advertisement determination computing device 102 may similarly determine item advertisements for other webpage positions of the webpage.

Figure 5:
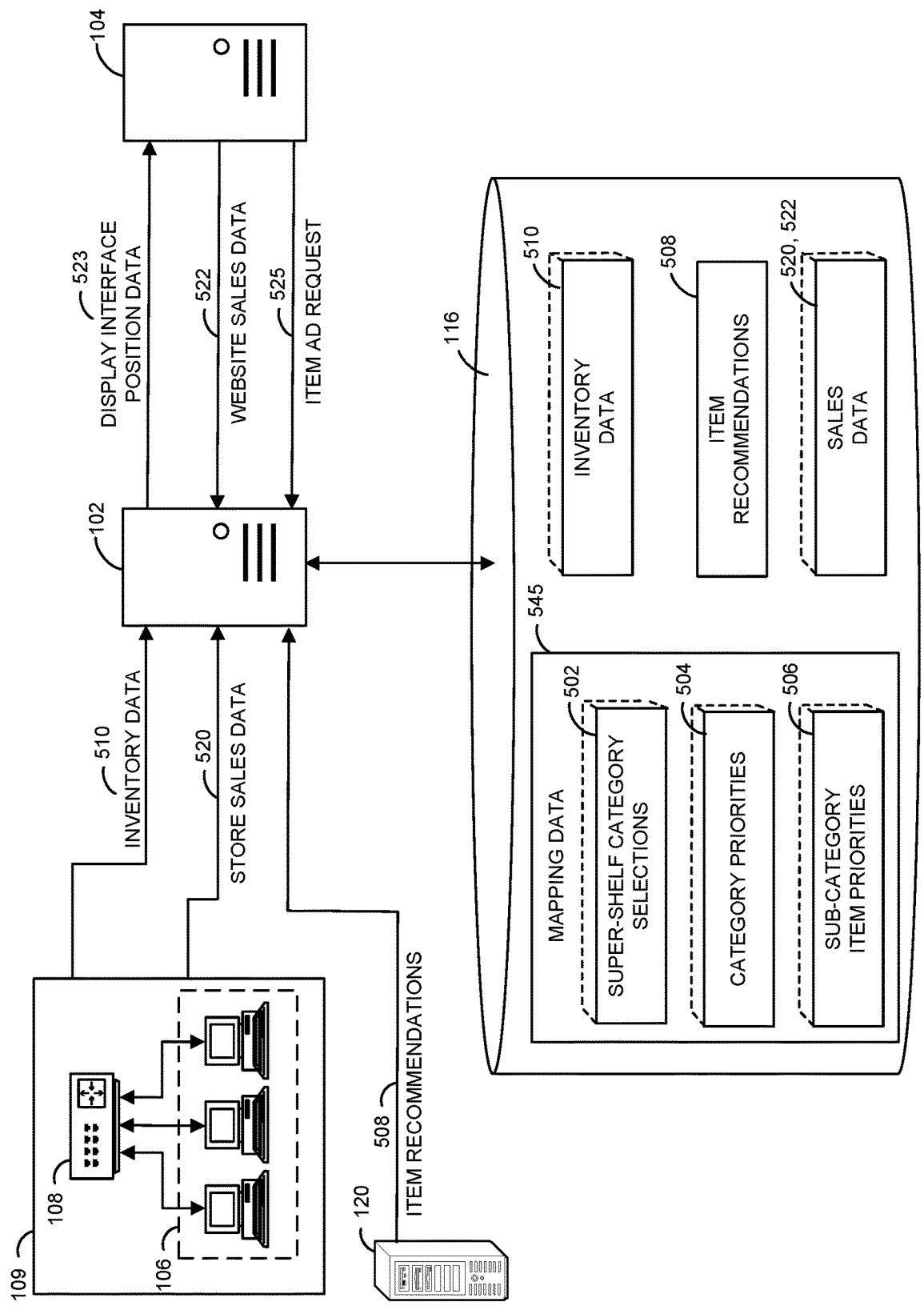
FIG. 5 is a block diagram of various exemplary portions of the item advertisement determination system of FIG. 1 in accordance with some embodiments.

FIG. 5 is a block diagram illustrating examples of various portions of the item advertisement determination system 100 of FIG. 1. As indicated in the figure, item advertisement determination computing device 102 may receive an item advertisement request 525 from a web server 104. The item advertisement request 525 may identify a request for item advertisements to display on a webpage, such as webpage 302. In response, item advertisement determination computing device 102 may generate display interface position data 523 identifying and characterizing item advertisements to display at each of a plurality of positions within the webpage. For example, display interface position data 523 may identify an item advertisement to display at each of a plurality of columns of each of a plurality of rows of a webpage, such as an item category webpage, or a retailer's homepage.

Item advertisement determination computing device 102 may generate the display interface position data 523 based on mapping data 545. Mapping data 545 may include configuration settings provided via one or more super user configuration GUIs 420 (e.g., super-shelf category selections 502), one or more category user configuration settings GUIs 450 (e.g., category priorities 504), and one or more sub-category user configuration settings GUIs 470 (e.g., item selections 506). In some examples, rather than determining item advertisements based on configuration settings provided via one or more sub-category user configuration settings GUIs 470 (e.g., and stored as item selections 506 within mapping data 545), item advertisement determination computing device 102 may receive item recommendations 508 from one or more item recommendation devices 120. In some examples, configuration settings identifying one or more item selections 474 identify one or more item recommendations 508 received from item recommendation devices 120.

As illustrated in FIG. 5, item advertisement determination computing device 102 may receive inventory data 510 from one or more stores 109, which may identify an inventory of one or more items available at each store 109. Similarly, inventory data 510 may identify an inventory of items for sale on a website, such as website 302. Item advertisement determination computing device 102 may store the inventory data 109 within database 116. In some examples, item advertisement determination computing device 102 may update inventory data 510 based on sales data 520 received from one or more stores 109, and from web server 104. For example, item advertisement determination computing device 102 may reduce an inventory of an item at a store 109 based on an indication that a unit of that item was sold at the store 109. Similarly, item advertisement determination computing device 102 may reduce an inventory of an item sold on a website hosted by web server 104 based on an indication that a unit of that item was sold via the website.

Item advertisement determination computing device 102 may rely on inventory data 510 to determine if an item is in stock at a particular store 109. Similarly, item advertisement determination computing device 102 may rely on inventory data 502 for web-based item sales as well. For example, as described herein, if an item is not in stock, item advertisement determination computing device 102 may not identify an item advertisement for the item (e.g., as identified by display interface position data 523), and instead may identify an item advertisement for an item that is in stock based on a prioritized list of items (e.g., as identified by configuration settings provided via a sub-category user configuration settings GUI 470).

Figure 6:
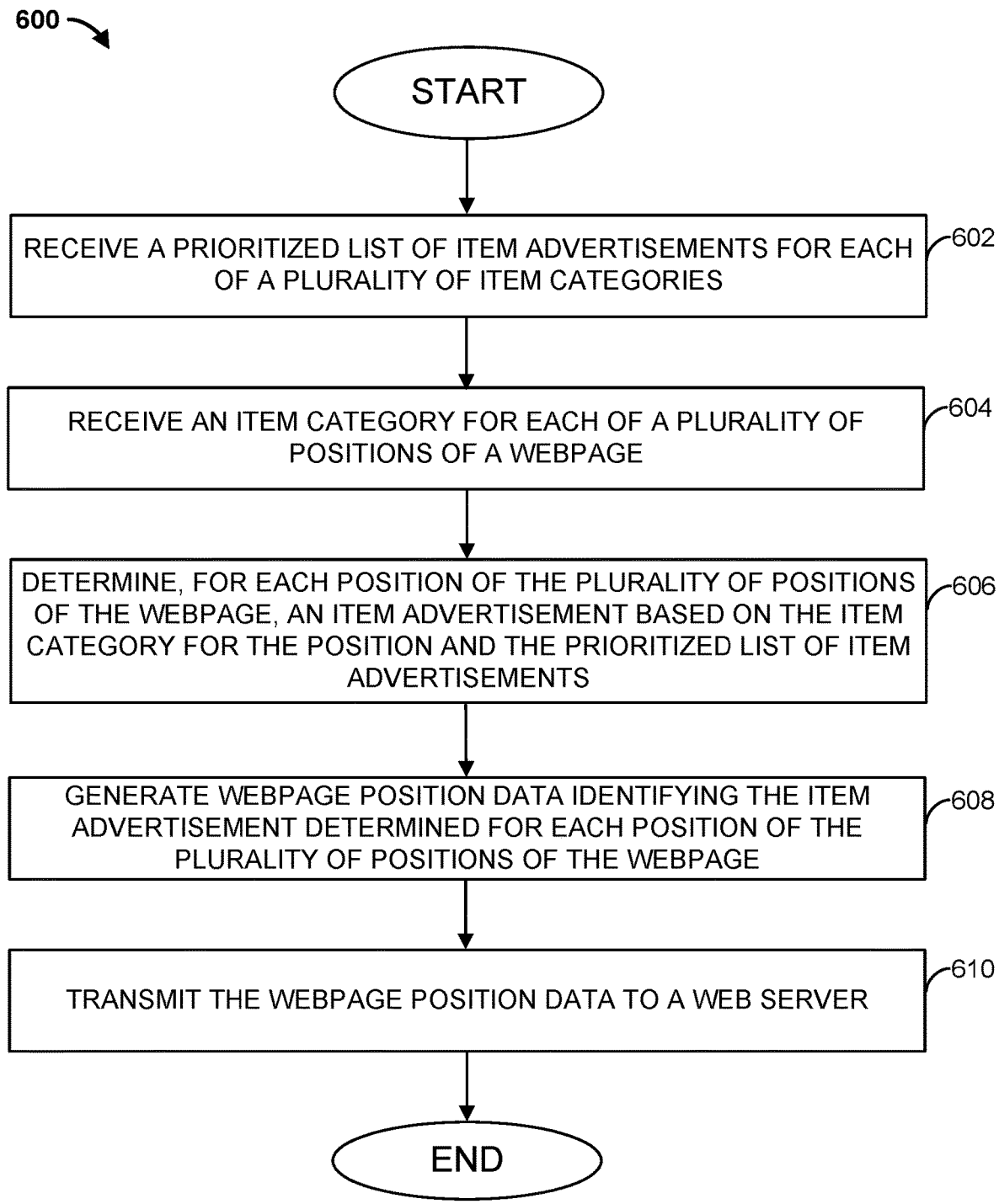
FIG. 6 is a flowchart of an example method that can be carried out by the item advertisement determination computing device of FIG. 1 in accordance with some embodiments.

FIG. 6 is a flowchart of an example method 600 that can be carried out by a computing device, such as the item advertisement determination computing device 102 of FIG. 1. At step 602, a prioritized list of item advertisements for each of a plurality of item categories is received. For example, item advertisement determination computing device 102 may obtain the prioritized list of item advertisements from database 116. The prioritized list of item advertisements may have been stored in database 116 in response to a user providing the prioritized list of item advertisements within a sub-category user configuration settings webpage 470. At step 604, an item category for each of a plurality of positions of a webpage are received. For example, item recommendation device 120 may obtain, from database 116, configuration settings identifying and characterizing the item category for each of the plurality of positions of webpage 302. The configuration settings may have been provided by a user via super user configuration settings webpage 420.

Proceeding to step 606, an item advertisement may be determined for each position of the plurality of positions of the webpage. The determinations may be based on the item category for each position and the prioritized list of item advertisements. For example, item advertisement determination computing device 102 may select, for each position of the webpage, an item advertisement for an item that is in a category that is in accordance with the item category (received in step 604) corresponding to the same position of the webpage. At step 608, webpage position data is generated. The webpage position data identifies the item advertisement determined for each position of the plurality of positions of the webpage. At step 610, the webpage position data is transmitted. For example, item advertisement determination computing device 102 may transmit display interface position data 523 to webserver 104. The method then ends.

Figure 7:
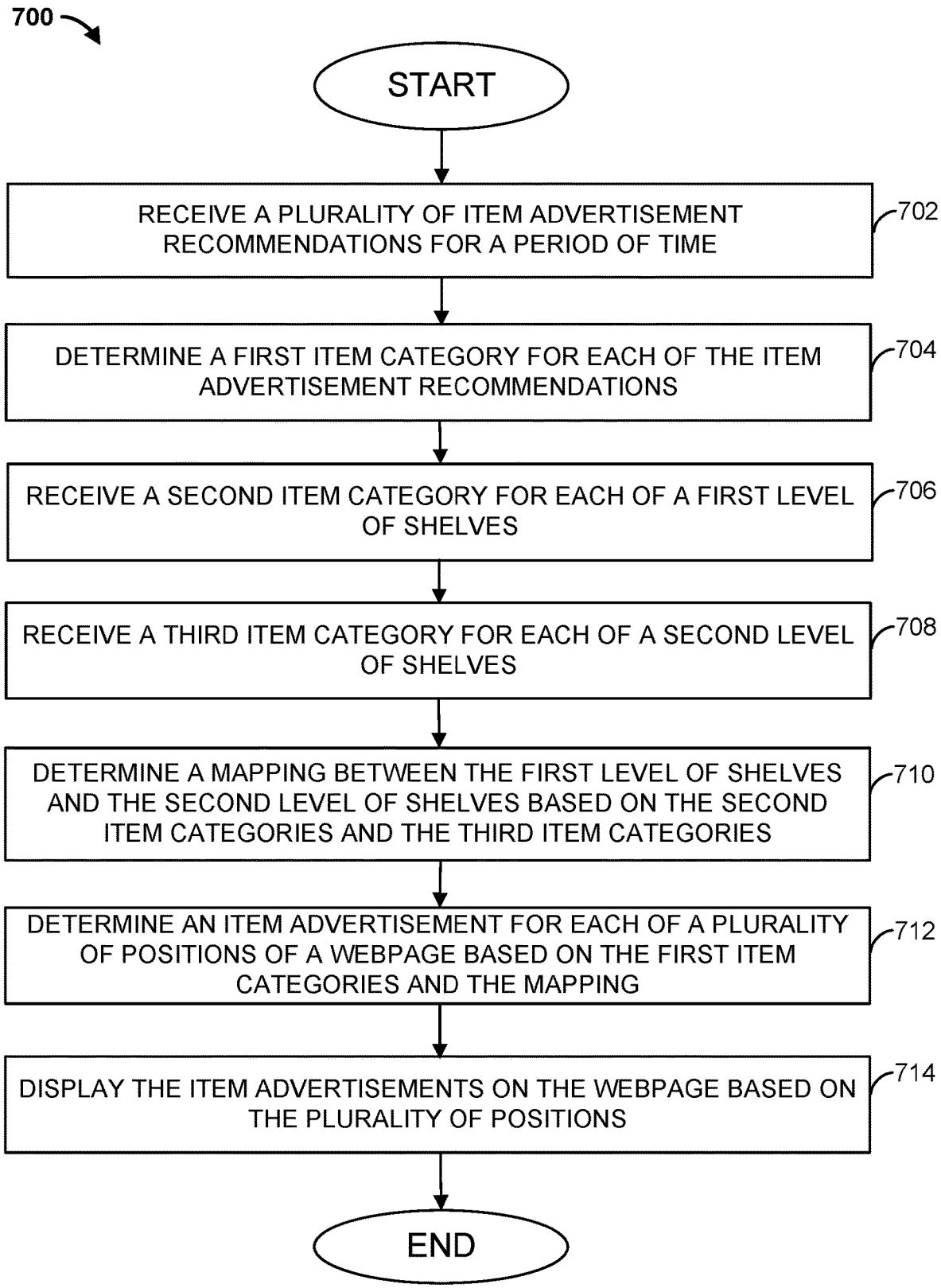
FIG. 7 is a flowchart of another example method that can be carried out by the item advertisement determination computing device of FIG. 1 in accordance with some embodiments.

FIG. 7 is a flowchart of an example method 700 that can be carried out by the computing device, such as the item advertisement determination computing device 102 of FIG. 1. Beginning at step 702, a plurality of item advertisement recommendations are received for a period of time. For example, item advertisement determination computing device 102 may receive the plurality of item advertisement recommendations from item recommendation device 120. At step 704, a first item category is determined for each of the item advertisement recommendations. For example, the first item category may be based on the type of item corresponding to each item advertisement recommendation (e.g., an item of an "apple" may receive a first item category of "fruits").

Proceeding to step 706, a second item category is received for each of a first level of shelves. For example, the second item categories may be based on configuration settings provided through super user configuration settings webpage 420, and may identify categories of items. At step 708, a third item category is received for each of a second level of shelves. The third item categories may be based on configuration settings provided through category user configuration settings webpage 450, for example. The third item categories may identify sub-categories of items.

Proceeding to step 710, a mapping is determined between the first level of shelves and the second level of shelves. The mapping is based on the second item categories and the third item categories. For example, item advertisement determination computing device 102 may determine one or more of the second level of shelves that identify item sub-categories (e.g., "apples," "bananas") of a corresponding item category (e.g., "fruits") to each first level shelf.

At step 712, an item advertisement is determined for each of a plurality of positions of a webpage. The determinations are based on the first item categories and the mapping. For example, each of the first level of shelves may correspond to a position of the plurality of positions of the webpage. Item advertisement determination computing device 102 may determine an item advertisement for each position that is for an item of the corresponding category (as defined by the corresponding first level shelf) and of a highest prioritized corresponding sub-category (as defined by the corresponding highest prioritized second shelf).

Proceeding to step 714, the item advertisements are displayed on the webpage based on the plurality of positions. For example, item advertisement determination computing device 102 may generate display interface position data 523 identifying and characterizing an item advertisement for each of the plurality of positions of webpage 302, and may transmit the display interface position data 523 to webserver 104. Web server 104 may parse and process the display interface position data 523 to display the item advertisements in accordance with the received positions. The method then ends.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
 a computing device configured to:
   determine a present date and time;
   identify item advertisement data including a start time and an end time defining a time range including the present date and time and inventory data;
   obtain, for each of a plurality of positions of a display interface, a corresponding first item category of a plurality of item categories;
   obtain, for the first item category for each of the plurality of positions, a prioritized list of sub-categories, the prioritized list of sub-categories includes a priority for each sub-category, wherein each priority is associated with one sub-category in the prioritized list, wherein each sub-category includes a ranked subset of a plurality of items associated with the first item category;
   determine, for each position of the plurality of positions of the display interface, an item advertisement based on the first item category for the position, the prioritized list of sub-categories for the first item category, and the item advertisement data by:
     determining if a highest ranked item in the ranked subset of the plurality of items for a highest prioritized sub-category in the prioritized list of sub-categories is in stock;
     in response to determining that the next ranked item of the plurality of items for the highest prioritized sub-category is in stock, selecting the highest ranked item as the item advertisement; and
     in response to determining that the highest ranked item in the plurality of items for the highest prioritized sub-category is not in stock:
       determining if a next highest ranked item in the plurality of items for the highest prioritized sub-category is in stock;
       in response to determining that the next highest ranked item in the plurality of items for the highest prioritized sub-category is in stock, selecting the next highest ranked item as the item advertisement;
       in response to determining the next highest ranked item in the plurality of items for the highest prioritized sub-category is not in stock, determining if the next highest ranked item in the plurality of items for the highest prioritized sub-category is a lowest ranked item; and
       in response to determining the next highest ranked item in the plurality of items for the highest prioritized sub-category is the lowest ranked item, determining if a highest ranked item in the ranked subset of the plurality of items for a next highest prioritized sub-category in the prioritized list of sub-categories is in stock;

generate display interface position data identifying the item advertisement determined for each of the plurality of positions of the display interface; and transmit the display interface position data.

2. The system of claim 1, wherein the computing device is configured to generate mapping data identifying a mapping of each item category to one or more of the prioritized sub-categories, wherein determining the item advertisement for each position of the plurality of positions of the display interface is based on the mapping data.

3. The system of claim 1, wherein the computing device is configured to provide a graphical user interface (GUI) for display, wherein receiving the first item category for each of the plurality of positions of the display interface comprises receiving input data entered by a user into the GUI.

4. The system of claim 1, wherein receiving item advertisement data identifying the plurality of items to advertise for each of the plurality of item categories comprises receiving at least one of the plurality of items to advertise from an item recommendation device.

5. The system of claim 1, wherein the system comprises a web server, and wherein transmitting the display interface position data comprises transmitting the display interface position data to the web server for display within the display interface.

6. The system of claim 1, wherein the prioritized list of sub-categories is generated based on configuration data for a first user level.

7. The system of claim 6, wherein the ranked subset of the plurality of items is generated based on configuration data for a second user level.

8. The system of claim 1, wherein the inventory data includes inventory data for a particular retail location.

9. A method comprising:
determining a present date and time;
identifying item advertisement data including a start time and an end time defining a time range including the present date and time and inventory data;
obtaining, for each of a plurality of positions of a display interface, a corresponding first item category of a plurality of item categories;
obtaining, for the first item category for each of the plurality of positions, a prioritized list of sub-categories, the prioritized list of sub-categories includes a priority for each sub-category, wherein each priority is associated with one sub-category in the prioritized list wherein each sub-category includes a ranked subset of a plurality of items associated with the first item category;
determining, for each position of the plurality of positions of the display interface, an item advertisement based on the first item category for the position, the prioritized list of sub-categories for the first item category, and the item advertisement data by:
determining if a highest ranked item in the ranked subset of the plurality of items for a highest prioritized sub-category in the prioritized list of sub-categories is in stock;
in response to determining that the next ranked item of the plurality of items for the highest prioritized sub-category is in stock, selecting the highest ranked item as the item advertisement; and in response to determining that the highest ranked item in the plurality of items for the highest prioritized sub-category is not in stock:
determining if a next highest ranked item in the plurality of items for the highest prioritized sub-category is in stock;
in response to determining that the next highest ranked item in the plurality of items for the highest prioritized sub-category is in stock, selecting the next highest ranked item as the item advertisement;
in response to determining the next highest ranked item in the plurality of items for the highest prioritized sub-category is not in stock, determining if the next highest ranked item in the plurality of items for the highest prioritized sub-category is a lowest ranked item; and
in response to determining the next highest ranked item in the plurality of items for the highest prioritized sub-category is the lowest ranked item, determining if a highest ranked item in the ranked subset of the plurality of items for a next highest prioritized sub-category in the prioritized list of sub-categories is in stock;
generating display interface position data identifying the item advertisement determined for each of the plurality of positions of the display interface; and
transmitting the display interface position data.

10. The method of claim 9, comprising generating mapping data identifying a mapping of each item category to one or more of the prioritized sub-categories, wherein determining the item advertisement for each position of the plurality of positions of the display interface is based on the mapping data.

11. The method of claim 9 comprising providing a graphical user interface (GUI) for display, wherein receiving the first item category for each of the plurality of positions of the display interface comprises receiving input data entered by a user into the GUI.

12. The method of claim 9, wherein receiving item advertisement data identifying the plurality of items to advertise for each of the plurality of item categories comprises receiving at least one of the plurality of items to advertise from an item recommendation device.

13. The method of claim 9, wherein the prioritized list of sub-categories is generated based on configuration data for a first user level.

14. The method of claim 13, wherein the ranked subset of the plurality of items is generated based on configuration data for a second user level.

15. The method of claim 9, wherein the inventory data includes inventory data for a particular retail location.

16. A non-transitory computer readable medium having instructions stored thereon, wherein the instructions, when executed by at least one processor, cause a device to perform operations comprising:
determining a present date and time;
identifying item advertisement data including a start time and an end time defining a time range including the present date and time and inventory data;
obtaining, for each of a plurality of positions of a display interface, a corresponding first item category of a plurality of item categories;
obtaining, for the first item category for each of the plurality of positions, a prioritized list of sub-categories, the prioritized list of sub-categories includes a priority for each sub-category, wherein each priority is associated with one sub-category in the prioritized list wherein each sub-category includes a ranked subset of a plurality of items associated with the first item category;

determining, for each position of the plurality of positions of the display interface, an item advertisement based on the first item category for the position, the prioritized list of sub-categories for the first item category, and the item advertisement data by:

determining if a highest ranked item in the ranked subset of the plurality of items for a highest prioritized sub-category in the prioritized list of sub-categories is in stock;

in response to determining that the next ranked item of the plurality of items for the highest prioritized sub-category is in stock, selecting the highest ranked item as the item advertisement; and in response to determining that the highest ranked item in the plurality of items for the highest prioritized sub-category is not in stock:

determining if a next highest ranked item in the plurality of items for the highest prioritized sub-category is in stock;

in response to determining that the next highest ranked item in the plurality of items for the highest prioritized sub-category is in stock, selecting the next highest ranked item as the item advertisement;

in response to determining the next highest ranked item in the plurality of items for the highest prioritized sub-category is not in stock, determining if the next highest ranked item in the plurality of items for the highest prioritized sub-category is a lowest ranked item; and in response to determining the next highest ranked item in the plurality of items for the highest prioritized sub-category is the lowest ranked item, determining if a highest ranked item in the ranked subset of the plurality of items for a next highest prioritized sub-category in the prioritized list of sub-categories is in stock;

generating display interface position data identifying the item advertisement determined for each of the plurality of positions of the display interface; and transmitting the display interface position data.

17. The non-transitory computer readable medium of claim 16 having instructions stored thereon wherein the instructions, when executed by the at least one processor, cause the device to perform further operations comprising generating mapping data identifying a mapping of each item category to one or more of the prioritized sub-categories, wherein determining the item advertisement for each position of the plurality of positions of the display interface is based on the mapping data.

18. The non-transitory computer readable medium of claim 16 having instructions stored thereon wherein the instructions, when executed by the at least one processor, cause the device to perform further operations comprising providing a graphical user interface (GUI) for display, wherein receiving the first item category for each of the plurality of positions of the display interface comprises receiving input data entered by a user into the GUI.

19. The non-transitory computer readable medium of claim 16, wherein the prioritized list of sub-categories is generated based on configuration data for a first user level.

20. The non-transitory computer readable medium of claim 19, wherein the ranked subset of the plurality of items is generated based on configuration data for a second user level.

21. The non-transitory computer readable medium of claim 16, wherein the inventory data includes inventory data for a particular retail location.

\* \* \* \* \*